INVENTOR
FRANK MARTINDELL
BY Emery Robinson
ATTORNEY

Nov. 3, 1959   F. MARTINDELL   2,911,086
TAPE CONTROLLED EMBOSSING MACHINE
Filed Aug. 25, 1954   11 Sheets-Sheet 2

INVENTOR
FRANK MARTINDELL
BY Emery Robinson
ATTORNEY

Nov. 3, 1959      F. MARTINDELL      2,911,086
TAPE CONTROLLED EMBOSSING MACHINE

Filed Aug. 25, 1954      11 Sheets-Sheet 4

INVENTOR
FRANK MARTINDELL
ATTORNEY

Nov. 3, 1959   F. MARTINDELL   2,911,086
TAPE CONTROLLED EMBOSSING MACHINE
Filed Aug. 25, 1954   11 Sheets-Sheet 5
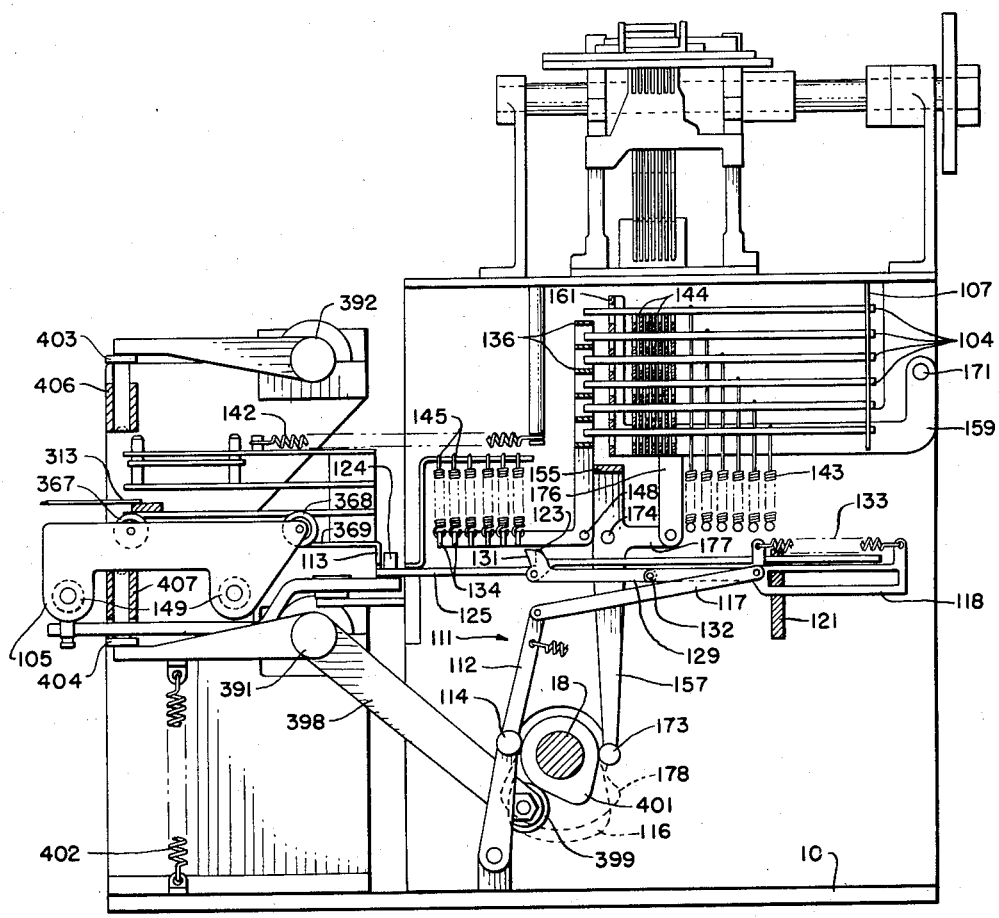
FIG. 5
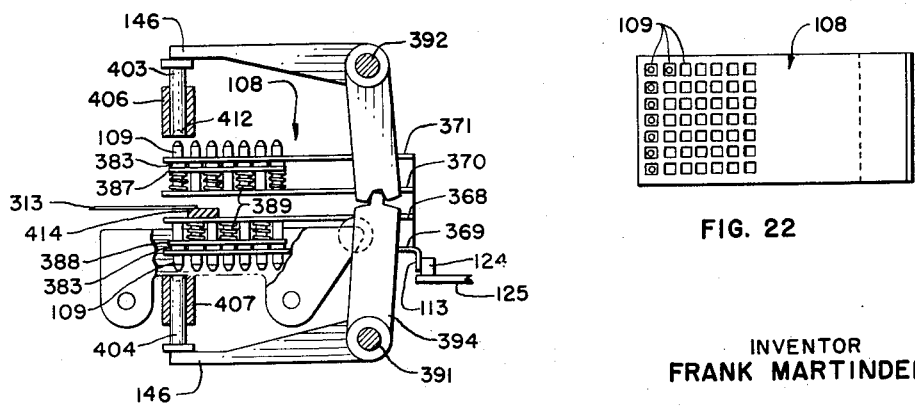
FIG. 23
FIG. 22
INVENTOR
FRANK MARTINDELL
BY Emery Robinson
ATTORNEY Nov. 3, 1959  F. MARTINDELL  2,911,086
TAPE CONTROLLED EMBOSSING MACHINE
Filed Aug. 25, 1954  11 Sheets-Sheet 6

INVENTOR
FRANK MARTINDELL
BY Emery Robinson
ATTORNEY

Nov. 3, 1959  F. MARTINDELL  2,911,086
TAPE CONTROLLED EMBOSSING MACHINE
Filed Aug. 25, 1954  11 Sheets-Sheet 7

INVENTOR
FRANK MARTINDELL
BY *Emery Robinson*
ATTORNEY

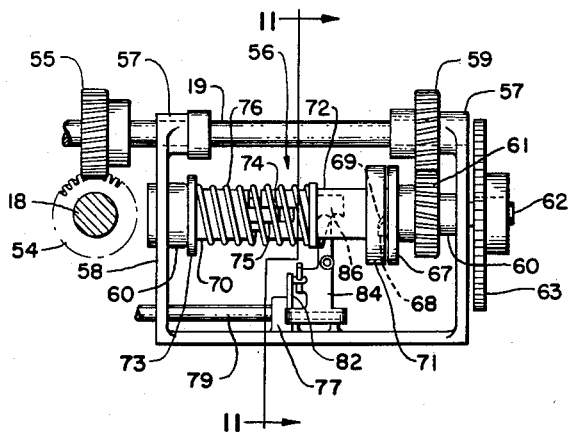
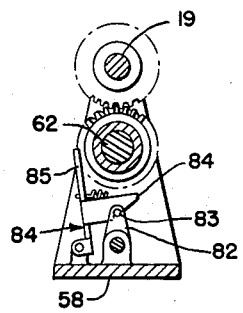
FIG. 10        FIG. 11
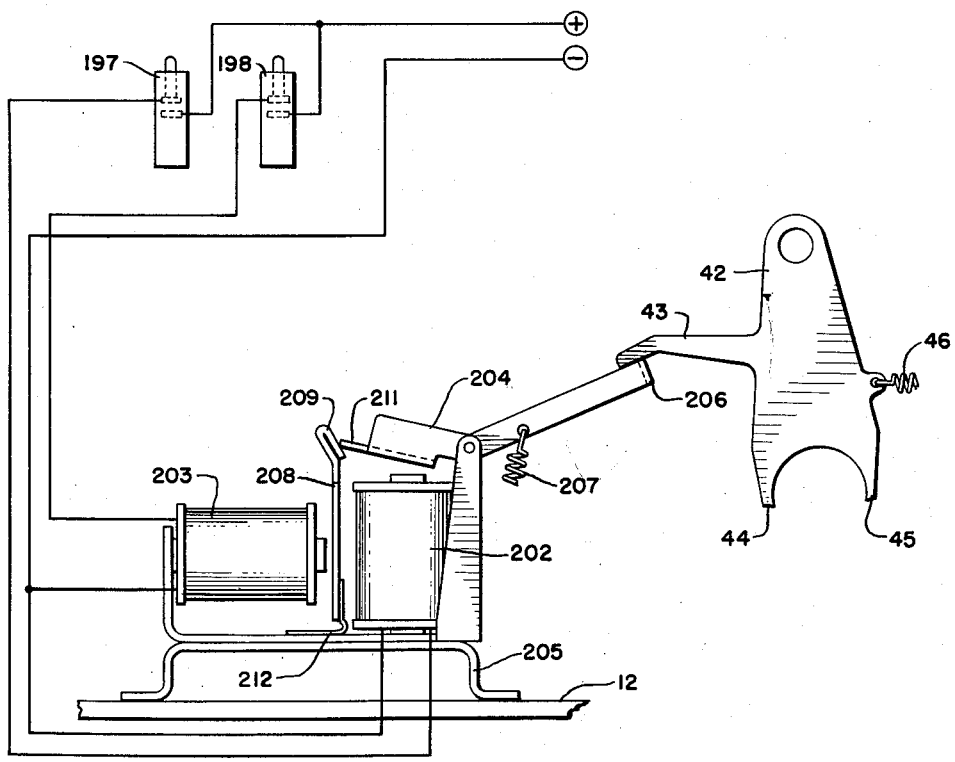
FIG. 12
INVENTOR
FRANK MARTINDELL
BY Emery Robinson
ATTORNEY Nov. 3, 1959  F. MARTINDELL  2,911,086
TAPE CONTROLLED EMBOSSING MACHINE
Filed Aug. 25, 1954  11 Sheets-Sheet 9
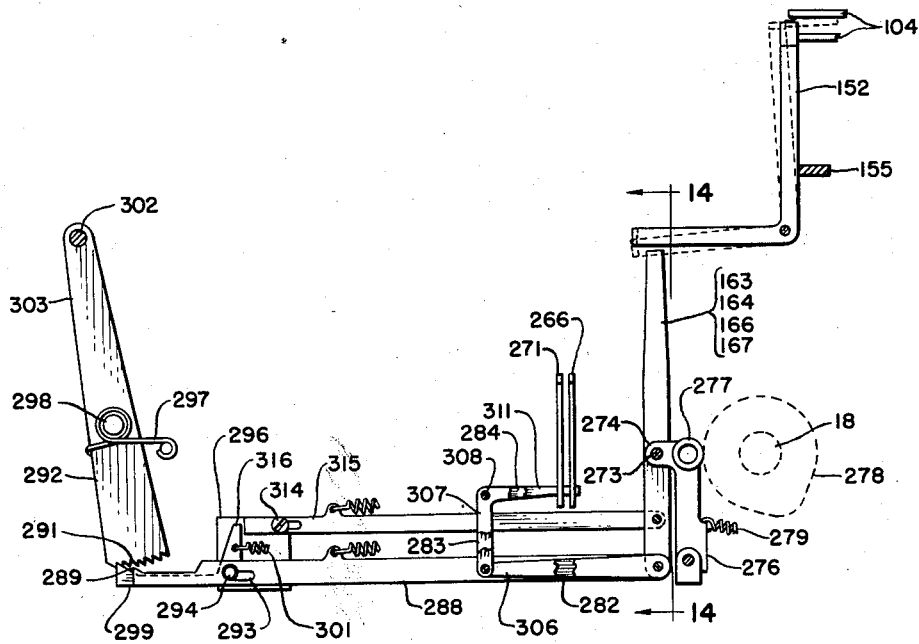
FIG. 13
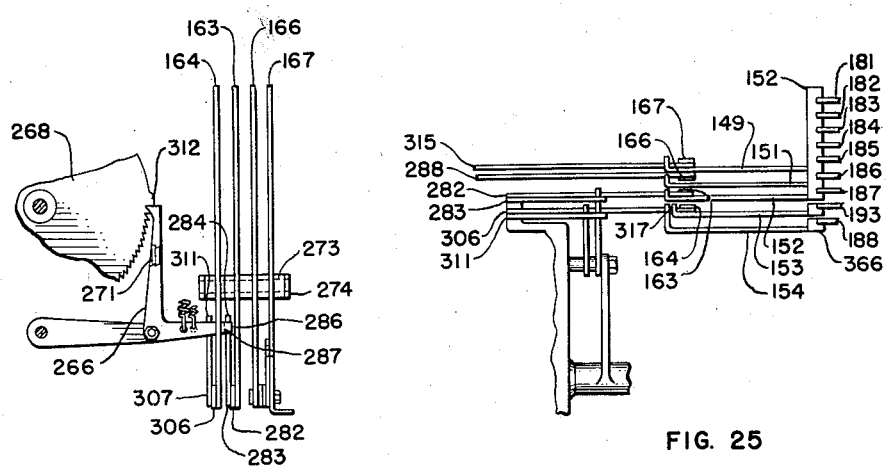
FIG. 14
FIG. 25
INVENTOR
FRANK MARTINDELL
BY Emery Robinson
ATTORNEY Nov. 3, 1959 F. MARTINDELL 2,911,086
TAPE CONTROLLED EMBOSSING MACHINE
Filed Aug. 25, 1954 11 Sheets-Sheet 10

INVENTOR
FRANK MARTINDELL
BY Emery Robinson
ATTORNEY

Nov. 3, 1959 F. MARTINDELL 2,911,086
TAPE CONTROLLED EMBOSSING MACHINE
Filed Aug. 25, 1954 11 Sheets-Sheet 11

INVENTOR
FRANK MARTINDELL
BY *Emery Robinson*
ATTORNEY

United States Patent Office 2,911,086
Patented Nov. 3, 1959

2,911,086

TAPE CONTROLLED EMBOSSING MACHINE

Frank Martindell, Millington, N.J., assignor, by mesne assignments, to Fairchild Camera & Instrument Corporation, a corporation of Delaware Application August 25, 1954, Serial No. 452,146

23 Claims. (Cl. 197—20)

This invention relates to apparatus utilized to stamp or emboss characters in relief upon printing plates. More particularly, the invention relates to automatically controlled and operated embossing machines wherein coded intelligence is supplied to the machine from a continuously advancing record or from a continuously transmitting telegraph line and is converted into mechanical movements which position a punch carrier in alignment with embossing levers for embossing characters upon plates as the plates are presented sequentially.

An important object of this invention is to provide an improved embossing machine.

Another object of this invention is to provide an embossing machine which is operated and controlled automatically.

A further object of this invention is to provide an embossing machine responsive to and controlled by local or remote signals.

An apparatus embodying certain features of the invention may include a record reader, a carriage, a co-ordinately positionable punch carrier, a translating device responsive to the record reader for continuously converting the record into mechanical motion thereby positioning the punch carrier and controlling the carrier, and a sensing unit controlled by the record reader for selectively suppressing that portion of the translating device associated with the punch carrier.

Briefly, the embossing machine according to the present invention comprises a magazine for containing a plurality of blank printing plates. Associated with the magazine are facilities for feeding the plates, one by one, to a plate carriage. The plate carriage in turn presents each plate to an embossing station under the control of suitable line feed and spacing mechanisms. After the plate is embossed it is ejected automatically and the above cycle is repeated. Located at the embossing station is a punch carrier which supports a plurality of punch and die assemblies (49 in the embodiment disclosed). Each punch and die assembly represents a character of intelligence and may be selectively positioned in alignment with a pair of embossing levers also located at the embossing station so that upon automatic operation of the embossing levers the selected punch and die assembly cooperate to emboss a character upon an interposed printing plate.

The punch carrier embracing the 49 punch and die assemblies is positionable co-ordinately by a rectilinear co-ordinate selector or code translator of the type which is the subject matter of my copending application Serial No. 375,402, filed August 20, 1953, now Patent No. 2,766,322. The code translator according to the present invention utilizes six code plates each provided with code notch accommodations in the manner and for the purpose disclosed and described in said copending application with the exception that a third group of selectable bars are provided in the code translator which are also engageable individually with adjacent notch accommodations in the code plates to initiate and control auxiliary functions of the embossing machine such as line feed, plate eject, carriage return and so forth. A seventh plate having code notch accommodations and referred to hereinafter as the blocking plate is also provided to the end that when said blocking plate is permutatively set in response to a predetermined signal read from the record, that portion of the translator which co-ordinately positions the punch carrier is rendered inoperative or blocked, while the third group of selectable bars are free to initiate said auxiliary functions.

In the present disclosure the six code plates are set permutatively in immediate response to a record reading device. However, when the record reader encounters certain predetermined signals the response to which is to be deferred or delayed, the mechanical selection of a blocking lever is accomplished which immediately obstructs the operation of a record advancing mechanism for a predetermined interval. The record reader, including the delay mechanism, is of the type disclosed and described in United States Patent No. 2,090,654 to L. M. Walden. Frequently it is desired to ignore or skip certain intelligence appearing on the advancing record and render the punch carrier non-responsive thereto. That portion of the record to which no response is desired is preceded by a predetermined signal which actuates a mechanism hereinafter referred to as a "skip, non-skip" mechanism for setting the blocking plate in blocking position, thus suppressing the embossing operation. A subsequent signal is assigned for reinstating the embossing operation.

It is to be noted that the blocking plate may be positioned for two different purposes depending upon whether or not it is co-operating with the delay mechanism or the skip mechanism, as will be more apparent presently. It is further noted that the present invention contemplates local control by a record reader such as shown in Fig. 16 of United States Patent No. 2,091,286 to H. L. Krum et al. or remote control such as by permutation code telegraph signals in well known manner.

A more complete understanding of the invention may be had from the following detailed description thereof when considered in connection with the appended drawings wherein:

Fig. 5 is a vertical section of Fig. 4 taken along the line 5—5;

Fig. 10 is a continuation of the cross shaft of Fig. 8 showing the rear end thereof and the associated selector clutch;

Fig. 11 is a vertical sectional view of Fig. 10 taken along line 11—11;

Fig. 12 shows the "skip, non-skip" magnets and associated electrical circuit;

Fig. 13 is a sectional view of Fig. 2 taken along the line 13—13 and shows the line feed, carriage return and plate eject linkages;

Fig. 14 is a sectional view of Fig. 13 taken along the line 14—14;

Fig. 22 shows a top view of the punch carrier;

Fig. 23 shows the punch carrier and the embossing levers;

Fig. 25 is a plan view of Fig. 13 showing the relationship of the function levers and the sensing bails of the field 17.

Figure 4:
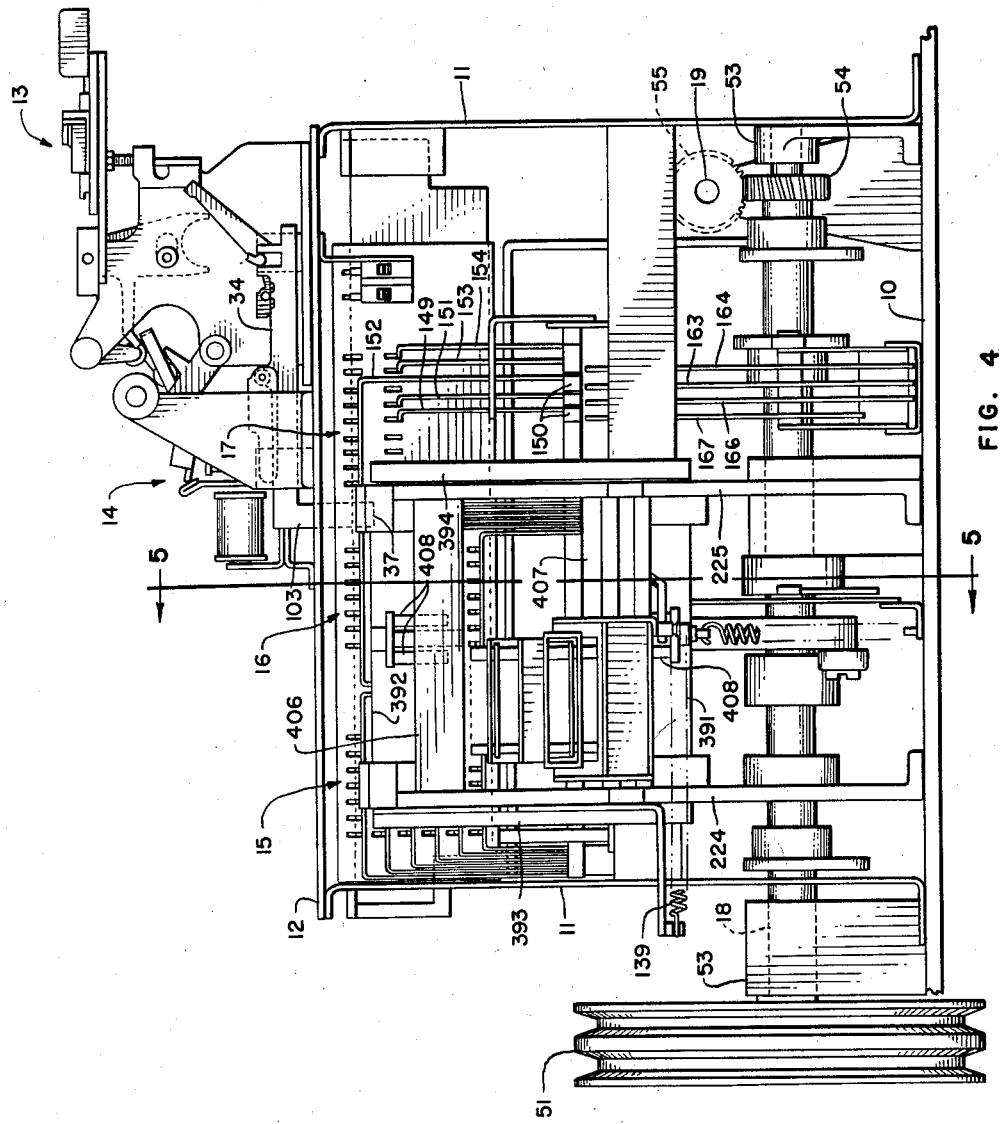
Fig. 4 is a front elevational view of the machine with the plate carriage and the plate magazine removed.

Referring now to the drawings, particularly to Fig. 4, there is shown a base plate 10 to which is secured a pair of parallel side plates 11—11 supporting an upper base or platform 12 for accommodating a record reading unit designated generally at 13 and a "skip, non-skip" mechanism 14. Disposed between the side plates 11 is the translator unit composed of three fields designated by the reference numerals 15, 16, and 17, respectively.

Drive mechanism

Figure 1:
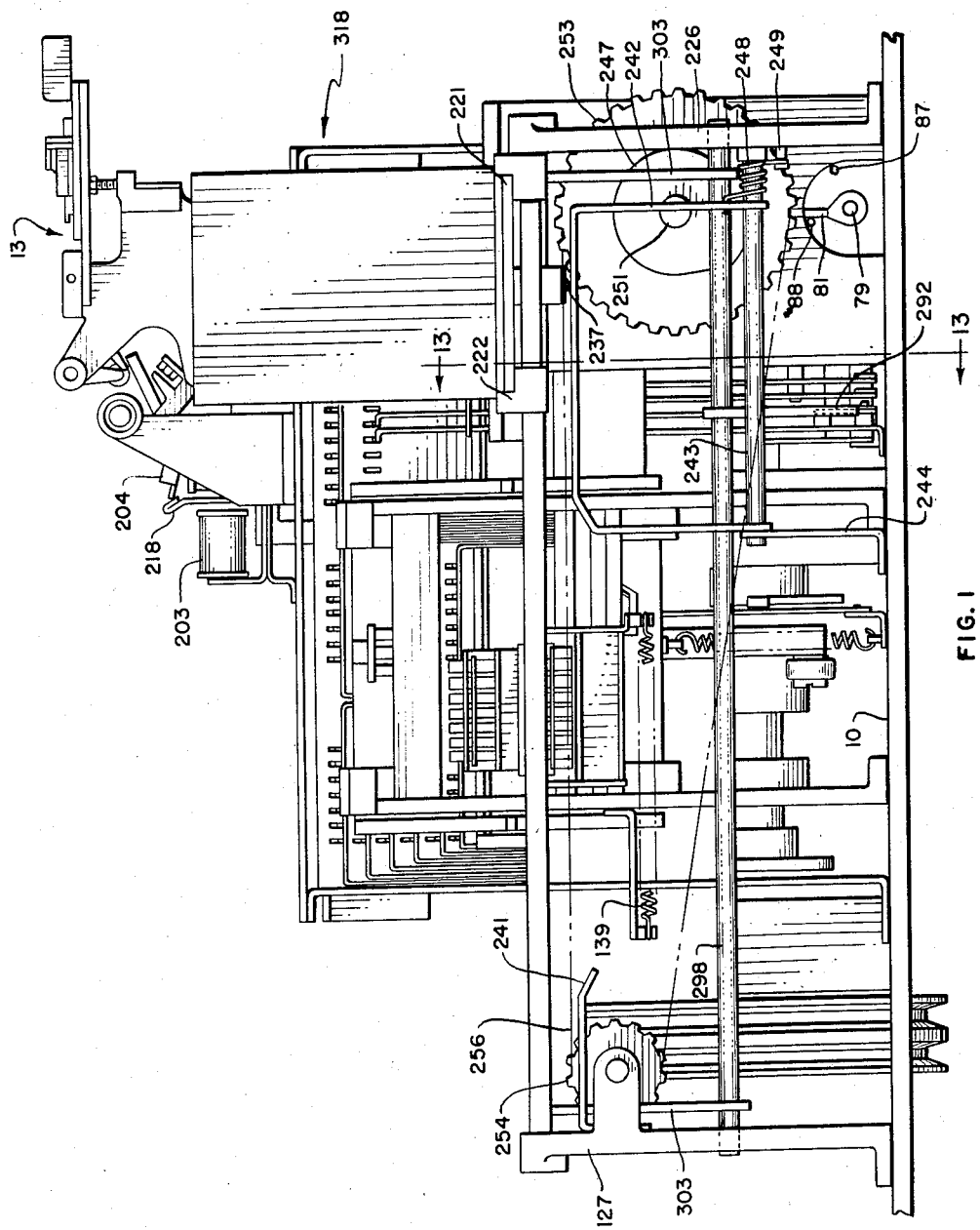
Fig. 1 is a front elevational view of a machine embodying the present invention.
Figure 2:
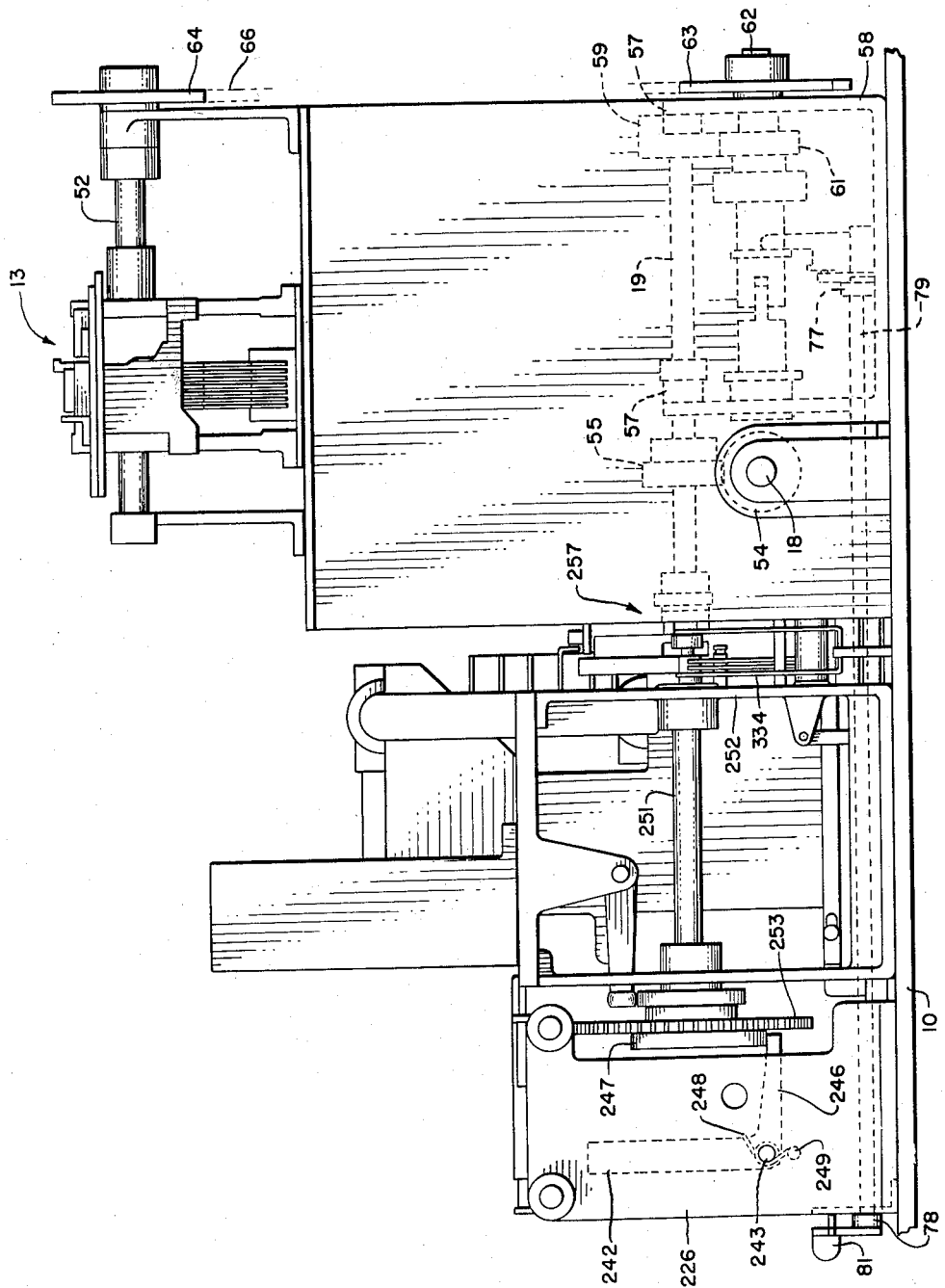
Fig. 2 is an elevational view of the right side of Fig. 1.

The embossing machine is operated by an electric motor (not shown) operatively connected to a sheave 51 keyed to a main drive shaft 18. The shaft 18 is supported in the bearings 53 rigidly mounted to the base plate 10. A spiral gear 54 is mounted on the main shaft 18 and is in operative engagement with a spiral gear 55 mounted on a cross shaft 19. As shown in Fig. 2 the cross shaft 19 is supported in bearings 57 which are integral with a frame 58 secured to the base plate 10. Mounted on the cross shaft 19, and more apparent in Fig. 10, is another spiral gear 59 in operative engagement with a spiral gear 61 rotatably mounted on a shaft 62 supported in bearings 60. Keyed to the right end of the shaft 62 is a sprocket 63 (Fig. 10). The sprocket 63 is connected to a sprocket 64 (Fig. 2) mounted on the record reader operating shaft 52 by means of a flexible chain 66. The embossing unit is placed in operation by actuating a clutch assembly 56 (Fig. 10). Integral with the gear 61 is a flange 67 having a lug 68. As is apparent in Fig. 10 the lug 68 may engage a notch 69 in a flange 71 integral with a sleeve 72 slidably mounted on the shaft 62. Mounted on the shaft 62 and keyed thereto is a second sleeve 70 having a flange 73. Integrally formed with the sleeve 70 is a spline 74 which is in slidable engagement with a splineway 75 in the sleeve 72. The sleeve 72 is urged to the right by a coil spring 76. Rotatably mounted in bearings 77 and 78 (Fig. 2) is an operating rod 79. As shown in Fig. 1, an operating lever 81 is keyed to the front end of the operating rod. Mounted on the rear end of the operating rod (Figs. 10 and 11) is a crank 82 having a pin 83 for engaging a lever 84. The lever 84 is pivotally mounted upon the frame 58 and has an arm 85 for engaging a cam surface 86 formed on the sleeve 72. As is apparent in Fig. 1 the operating rod may assume an "on" and "off" position. Rotation of the operating lever 81 in a clockwise direction until the lever abuts a pin 87 constitutes the "off" position, while rotation of the lever in a counterclockwise direction until the lever abuts a similar pin 88, represents the "on" position. When the operating lever is in the "off" position, operation of the main drive shaft 18 (Figs. 2 and 10) will impart rotative motion in a clockwise direction to the cross shaft 19 as viewed in Fig. 11. Correspondingly the gear 61 will rotate in a counterclockwise direction without imparting any motion to the shaft 62 since the clutch 56 is disengaged. While the operating lever is in the "off" position, the arm 85 will be in engagement with the cam surface 86 upon the sleeve 72 holding the sleeve 72 to the left, as viewed in Fig. 10. The position of the sleeve 72 to the left is sufficient to keep the lug 68 free of engagement with the recess 69. In this condition of the clutch no motion will be imparted to the shaft 62 and correspondingly the record reader shaft 52 (operated through chain 66) will remain motionless. To place the record reader in operation it is necessary to rotate the operating lever to the "on" position causing the arm 85 of the lever 84 to become disengaged from the cam surface 86 thereby permitting the recess 69 in the flange 71 to move into engagement with the lug 68 in co-operation with the spring 76. This action causes the sleeve 72 to drive the sleeve 70 which in turn drives the shaft 62 and the sprocket 63 mounted thereon.

Record reader

Figure 24:
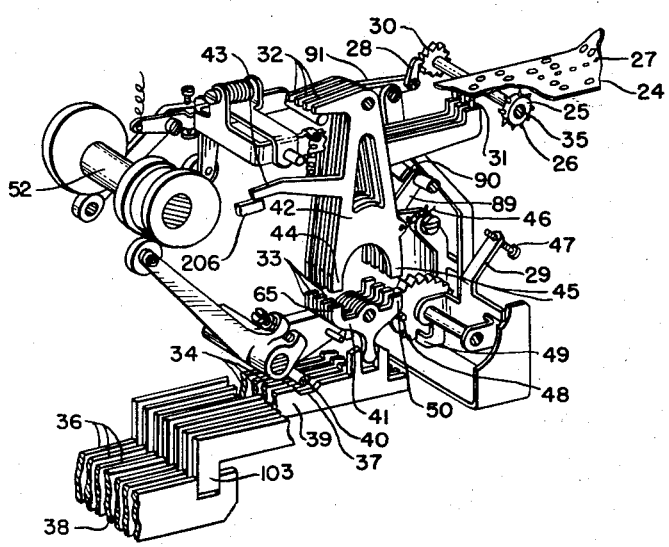
Fig. 24 shows the relationship of the blocking lever with the delay mechanism and the skip, non-skip mechanism.

The record reader 13 (Fig. 4) is of the type disclosed in the aforementioned patent to Wallden and, as shown in Fig. 24, a tape 24 perforated in transverse rows in accordance with a code such as the Baudot code is advanced by a feed wheel 25 mounted on a shaft 35, having small radially extending pins 26 which engage a center row of perforations 27 in the tape. The feed wheel 25 is operated by the engagement of a reciprocating pawl 28 with a ratchet 30 keyed to the shaft 35. The reciprocatory motion of the pawl 28 is derived from a cam secured to the record reader operating shaft 52 in the manner disclosed in the aforementioned patent. The perforated tape is read by six feeler pins 31 which, depending upon whether or not a perforation is encountered, cause the feeler levers 32 in co-operation with the T-levers 33 to cast their respective code plate extensions 34 to the right or to the left thereby positioning code plates 36 permutatively.

Record feed delay mechanism

As in the said patent to Walden and as shown in Fig. 24, a seventh plate or blocking plate 38 having an extension 39 is provided. The blocking plate is positionable by the co-operation of a T-lever 41 and a blocking lever 42. The general contour of the lever 42 is similar to the six feeler levers 32 except that no arm for supporting a feeler pin 31 is provided. In lieu thereof the lever 42 is provided with an arm 43 and is urged in a counterclockwise direction by a spring 46 so that a leg 45 of the lever 42 is normally in blocking position with respect to a projection 50 of the T-lever 41 such that upon the periodic upward motion of the T-lever 41 the blocking plate 38 and its associated extension 39 are moved to the left, their normal position. Each code plate extension 34 as well as the extension 39 is provided with a notch 37 located such that when predetermined code perforations (in the present invention the code perforations are those denoting plate eject) the response to which is to be delayed, are read by the six feeler pins, the plate extensions 34 are set permutatively so as to align all the notches 37 transversely thereby permitting a rod 40 to move downwardly. Reception of the rod 40 by the aligned notches causes a lever 89 to assume a blocking position with respect to an extension 90 of the tape feed lever 91 so as to suppress the advance of the perforated tape 24 for an interval equivalent to a predetermined number of revolutions of the record reader shaft 52. At the expiration of the above interval a pin 48 strikes a projection 49 of a lever 29 causing a set screw 47 to engage and rotate the blocking lever 42 clockwise (Fig. 24). The leg 44 of the lever 42 is then in blocking position with respect to the projection 65 of the T-lever 41. Upon the next revolution of the record reader shaft the blocking plate extension 39 will be moved to the right causing the rod 40 to be cammed upwardly and out of the aligned notches 37 thus releasing the extension 90 of the tape feed lever 91 and thereby reinstating the advance of the perforated tape. As described in said patent to Walden the blocking plate 38 will assume its normal position to the left upon the next revolution of the record reader shaft.

Translator

Figure 7:
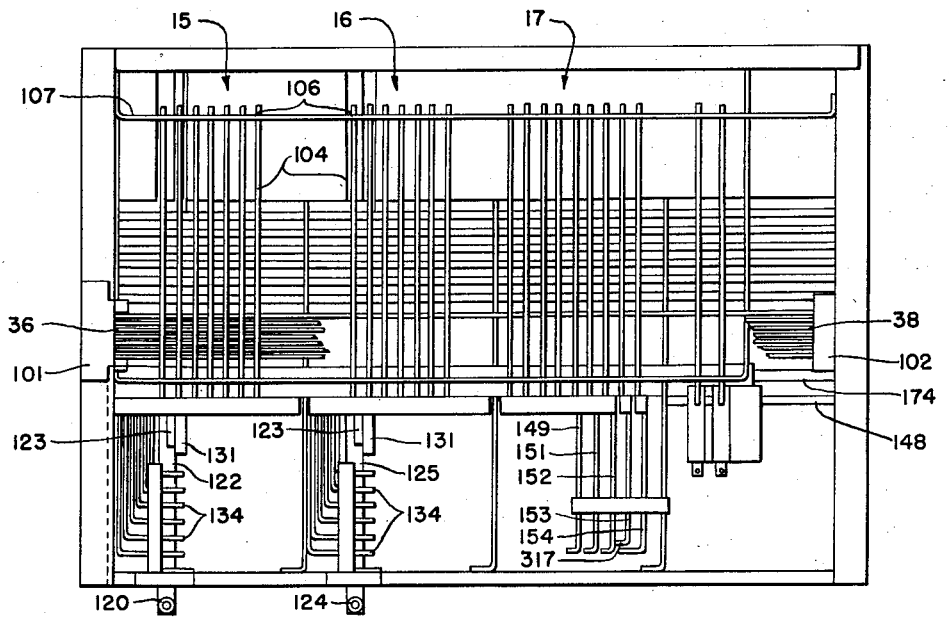
Fig. 7 is a plan view of the translating device.
Figure 6:
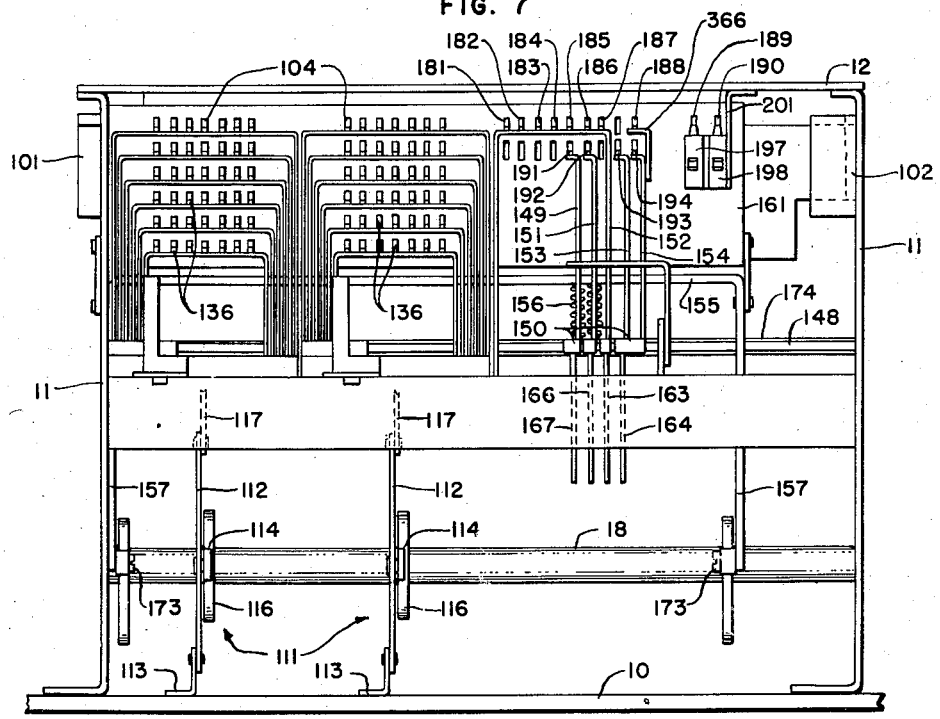
Fig. 6 is a front elevational view of the translating device.
Figure 19:
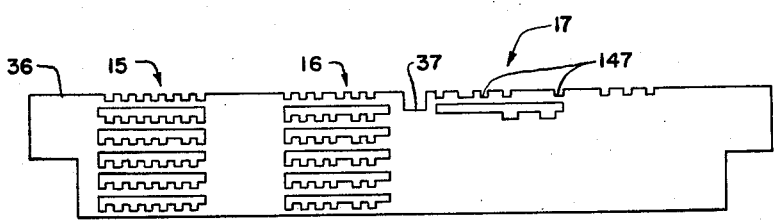
Fig. 19 shows a typical code plate.

The translator which is shown in Figs. 6 and 7 is of the type shown in my copending application Serial No. 375,402, filed August 20, 1953, and consists of six code plates 36 and the blocking plate 38 each having a configuration generally similar to that of the plate shown in Fig. 19. The code plates 36 and the blocking plate 38 are slidably mounted in guide blocks 101 and 102 secured to the side plates 11. Each code plate as well as the blocking plate is provided with a notch 37 (Fig. 19) for accepting a depending arm 103 of its associated extension 34 as shown in Fig. 4. The code plates are positionable individually and permutatively either to the right or to the left in response to the six feeler levers 32 (Fig. 24) of the record reader in the manner disclosed and described in said patent to Walden. A plurality of sensing bars 104, Fig. 6 (98 in the present invention), are threadedly related to the six code plates including the blocking plate and are pivotally supported at the rear ends thereof in holes 106 of a cross plate 107. The sensing bars 104 are divided into groups or fields as previously stated wherein the field designated generally at 15 controls the lateral co-ordinate and the field designated at 16 controls the front to rear co-ordinate of a co-ordinately positionable member in the manner described in said copending application Serial No. 375,402. The co-ordinately positionable member in the present invention is a punch carrier 108 (Fig. 3) which supports a plurality (49 in the embodiment disclosed) of punch and die assemblies 109. The punch carrier 108 is positioned co-ordinately by means of two knee action devices 111, Fig. 5 (one for each direction of motion), operated by the levers 112 (Figs. 5 and 6) pivotally mounted on the base 10, and whose cam followers 114 are in engagement with operating cams 116 secured to the main shaft 18. Rotation of the shaft 18 causes the operating levers 112 to be rotated counterclockwise (Fig. 5) as the followers 114 encounter the high point on the operating cams 116. Links 117 are pivotally mounted to the operating levers 112 and to slotted guides 118 slidably supported in a guide block 121. Long, narrow push rods 122 and 125 having ears 123 and lugs 120 and 124 are guided at the rear thereof by the guide block 121 (Figs 5 and 7). Pivotally mounted to each link 117 and to each push rod is an articulated link 129 having an anticipator 131. Each articulated link 129 is designed so that it will break downwardly at 132 and is held in a horizontal position by a spring 133. As the push rods 122 and 125 are moved to the left as viewed in Fig. 5 by the counterclockwise rotation of the levers 112, the anticipator 131 of each knee action device 111 will ultimately strike a lateral projection 134 of a sensing bail 136 selected one each from the fields 15 and 16 in the manner disclosed in said copending application. The lug 120 of push rod 122 engages a crank 137 (Fig. 3) to move the punch carrier 108 to the right (as viewed in Fig. 3) a predetermined distance against the action of a spring 139. Correspondingly, the lug 124, of the second push rod 125, engages the punch carrier 108 at 113 (Fig. 5) to move the carrier outwardly a predetermined distance against the action of a spring 142.

The sensing bars 104 are biased downwardly by the springs 143 and are freed, cyclically, to enter transverse alignments of code plate notches when such alignments occur. For example, a certain permutative setting of the code plates 36 will produce an alignment of notches 144 such that a sensing bar of field 15 and a sensing bar of the field 16 are free to drop in the alignment notches and be selected as disclosed in said copending application. In the selected position each bar will be in blocking relationship with respect to one of the nested sensing bails 136 of the fields 15 and 16, respectively. The lateral projections 134 of the blocked sensing bails in turn will block the push bars 122 and 125 (Fig. 7), ultimately positioning the punch carrier 108 co-ordinately. This action results in the alignment of a particular punch and die assembly 109 with embossing levers 146 (Fig. 23).

Punch carrier assembly and embossing levers

Figure 3:
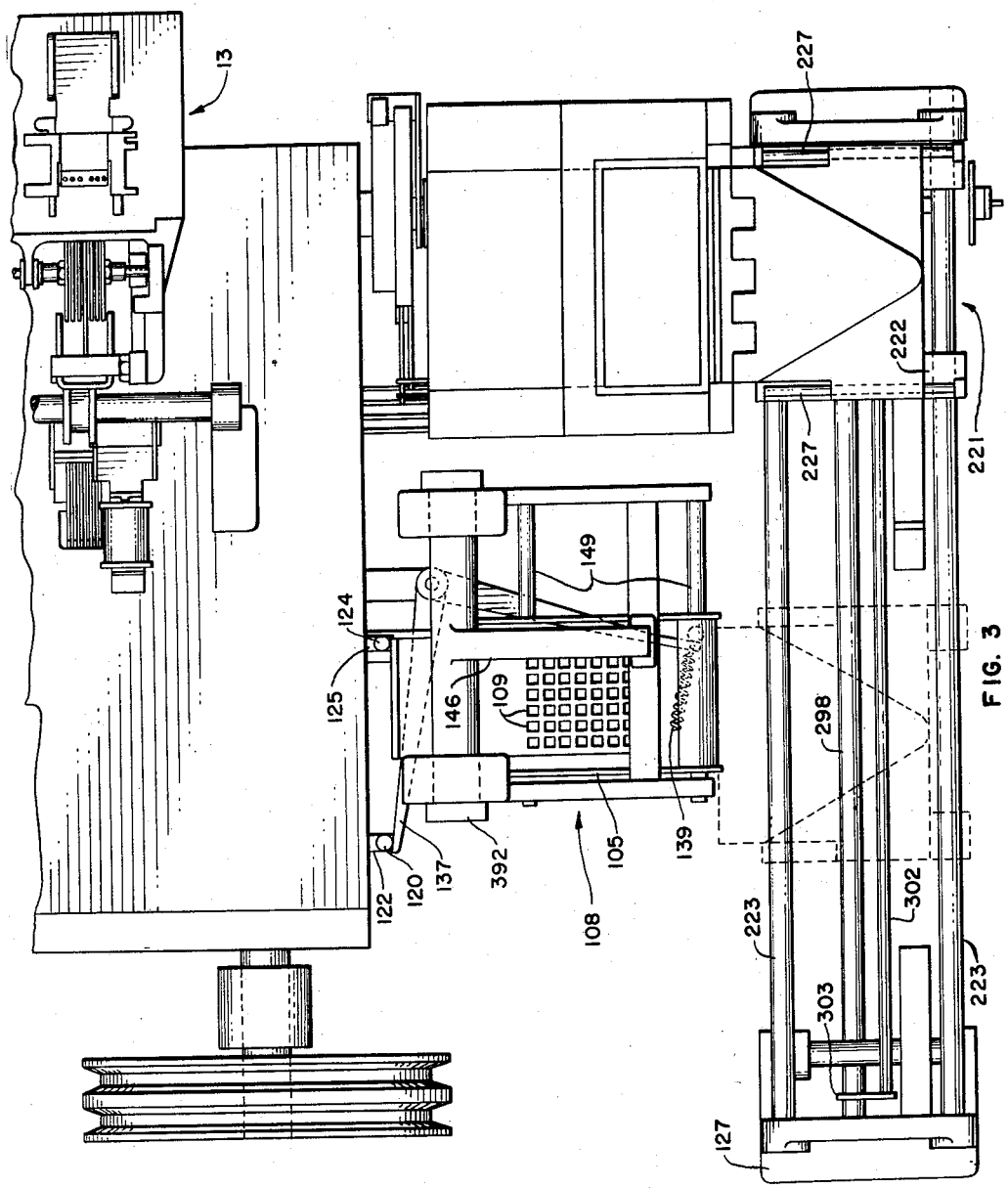
Fig. 3 is a plan view of Fig. 1.

The punch carrier assembly consists of a frame 105 (Fig. 5) slidably mounted upon cross rods 149 and movable transversely along the rods to the right as viewed in Fig. 3, by the engagement of the crank 137 and the lug 120. Mounted in the frame 105 are four rollers 367 (Fig. 5) for engaging plates 368 and 369 of the punch carrier 108 so that engagement of the lug 124 of the push rod 125 with a lip 113 of the plate 369 will move the punch carrier outwardly.

The punch carrier 108 consists of four plates 368, 369, 370 and 371 spaced apart by blocks and each having 49 holes therein for receiving the 49 punch and die assemblies 109 as shown in Fig. 23. Each punch and die has a collar portion 383 which rests normally against the plates 369 and 371, respectively. The punches and dies are held in this position by stripper plates 387 and 388 which are in turn supported by springs 389 which surround the punches and dies alternately. In the present embodiment of the invention each punch and die assembly represents a character of intelligence.

Supported in uprights 224 and 225 (Fig. 4) are the cross shafts 391 and 392 having articulated driving arms 393 and 394, respectively (Figs. 4 and 23). The driving arms are keyed to the shafts 391 and 392 and are articulated as shown in Fig. 23. Mounted to the center of cross shafts 391 and 393, respectively, and at a location referred to hereinafter as the embossing station, are embossing levers 146 (Fig. 3). Immediately adjacent to the lower embossing lever 146 is an operating lever 398 (Fig. 5) having a cam follower 399 held in engagement with an embossing cam 401, mounted upon the main operating shaft 18, by a spring 402. In timed sequence with respect to the positioning of the punch carrier 108 the lower embossing lever 146 is rotated clockwise (Figs. 5 and 23) causing the upper lever 146 to co-operate to drive push pins 403 and 404 supported in cross bars 406 and 407 into engagement with a selected punch and die assembly to emboss a character upon a plate 313. Push pins 403 and 404 are guided by the pins 408 (Fig. 4) which are in sliding engagement with the cross bars 406 and 407. Note that each push pin is provided with a frusto-conical recess 412 (Fig. 23) for engaging a complementary surface contour of each punch and die assembly so as to bring the selected assembly into exact alignment. When the embossing operation is completed the punch carrier 108 is drawn back to its origin in response to the springs 139 and 142 (Figs. 3 and 4) to await the selection of the next character. Cross bar 414 (Fig. 23) is provided to give support to the plate while being embossed.

Auxiliary function field

Code notch accommodations 147 constituting the field 17 (Fig. 19) are provided in the code plates 36 to initiate and control auxiliary functions as will be described in greater detail hereinafter. A cross rod 148 (Fig. 6) suitably secured to the side plates 11 acts as a support and pivot point for the nested sensing bails of the fields 15 and 16 and also supports sensing bails 149, 151, 152, 153, and 154 of the function field 17. Each bail of the function field is biased by the springs 156 so as to bear against a web portion 155 of a bail actuating member 157 in the same manner as the sensing bails 136 are positioned against said web portion. As disclosed in said copending application the sensing bars 104 of fields 15 and 16 are supported pivotally by the cross plate 107 having apertures through which the sensing bars extend (Fig. 7). Sensing bars 181 through 194 are similarly supported and are biased in a counterclockwise direction by the springs 143 (Fig. 5) so that all sensing bars tend to rest upon the coded edges of the code plates 36 and the blocking plate 38. Cyclically, as will presently appear, the sensing bars of all three fields are lifted from and returned to the code plates by a lift plate 161 (Fig. 5). The sensing bails of the function field 17 although susceptible to blocking in the same manner as those of the fields 15 and 16 do not co-operate with knee action devices. On the contrary, the lower lateral projections 150 (Figs. 4 and 6) of the sensing bails 149 and 151 through 154 block co-operating function levers 163, 164, 166, and 167. The lift plate 161 is integral with a pair of arms 159 pivotally mounted on a cross rod 171 (Fig. 5). Lift plate actuating members 157 having cam followers 173 are pivotally mounted on a cross rod 174. Two links 76 are each pivotally connected to arm 159 and a projection 177 of the actuating member 157. As is apparent in Fig. 5 the sensing bails bear against the web portion 155 of the actuating member 157 constantly, so that the cam follower 173 is held against its operating cam 178, mounted on the shaft 18, by the tension of springs 145. Thus, when the cam follower 173 approaches the high portion of the cam 178, the actuating member 157 will rotate counterclockwise to hold all sensing bails in the dotted line position shown in Fig. 13. Correspondingly, the lift plate 161 will rotate clockwise (Fig. 5) about the rod 171 to raise all sensing bars 104, clear of the code plates. At this moment the code plates are permutatively set in response to the record reader, whereupon the cam follower 173 encounters the low portion of the cam 178 causing the lift plate 161 to drop, and at the same time to permit the sensing bails to pivot in a clockwise direction. The link 176 is designed so that all sensing bars 104 and 181 through 194 are permitted to move downwardly (Fig. 5) before the sensing bails rotate in a clockwise direction so that the reception of a sensing bar 104 in a transversely aligned row of notches in the code plates 36 will block the return of the sensing bails corresponding to the selected bars 104 selected in the manner shown in dotted lines in Fig. 13. As disclosed in said copending application, the co-ordinately positionable element (the punch carrier 108 in the present invention) is positioned co-ordinately by the selection of one sensing bar in field 15 and one bar in field 16. The various functions such as line feed, skip, non-skid, etc., are initiated by the selection of sensing bars in field 17. Although the particular embodiment of the invention herein disclosed does not contemplate a selection of a sensing bar in all fields simultaneously, it is entirely within the scope of this invention to do so.

*Plate carriage and spacing mechanism*

Figure 20:
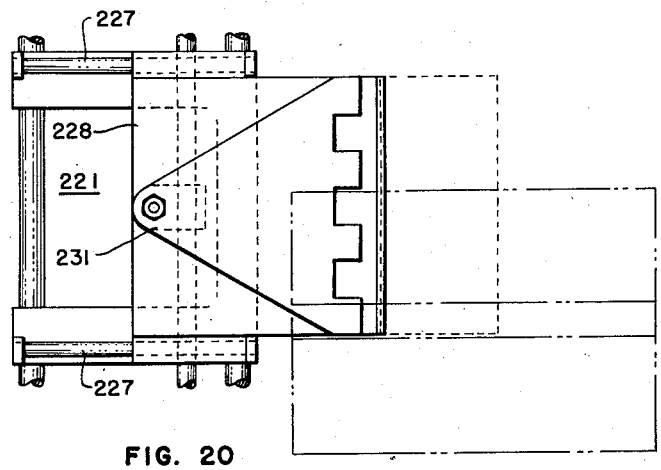
Fig. 20 shows a top view of the plate carriage.
Figure 21:
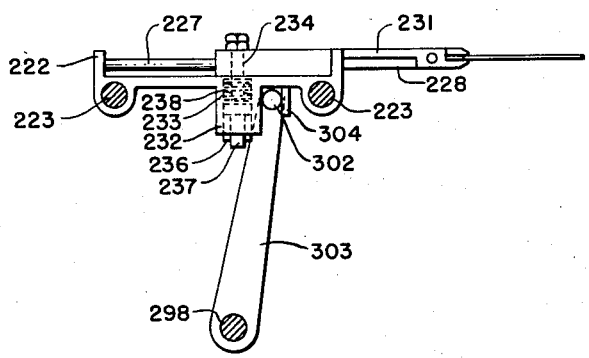
Fig. 21 is a side view of Fig. 20.

A plate carriage designated generally at 221 (shown in detail in Figs. 20 and 21) having a frame 222 is slidably mounted upon two carriage rods 223. Mounted on rods 227 supported in the frame 222 and slidable thereon is a jaw 228 of a scissors type clamp. Pivotally mounted to the jaw 228 is a co-operating jaw 231. Suitably fastened to the jaw 228 is a sleeve 232 having a counterbore 233. In threaded engagement with the jaw 231 is a pin 234 having a bifurcated end portion 236 in sliding engagement with the counterbore 233. A roller 237 is pinned to the bifurcated end portion of the pin 234. A spring 238 is positioned between the upper surface of the bifurcation and the bottom of the counterbore such that the spring tends to cause the jaws to close. A strap 241 is secured to an upright 127 (Fig. 1) so that when the plate carriage 221 approaches its extreme left-hand or plate eject position, the strap 241 engages the roller 237 camming it upwardly thereby operating the jaws 228 and 231. Correspondingly as the plate carriage moves to the right to assume a position known as plate feed, a strap 242 pivotally mounted on a shaft 243 is encountered which also engages the roller 237 to open the jaws 228 and 231. The shaft 243 is supported by the upright 226 and the angle iron 244 secured to the base plate 10.

As shown in Fig. 2 the strap 242 has a laterally extending arm 246 which is held in engagement with a jaw operating cam 247 by a spring 248 one end of which is secured to a lug 249 mounted upon the upright 226 and the other end of which bears against the strap 242. The jaw operating cam 247 is keyed to a plate carriage position shaft 251 mounted in a U-shaped frame 252 suitably fastened to the base plate 10. A carriage drive sprocket 253 keyed to the shaft 251 is operatively connected by means of an endless flexible chain 256 to a carriage return sprocket 254 (Fig. 1), mounted in the upright 127. The chain 256 is secured to the carriage frame 222, and the return sprocket 254 has a return spring (not shown) wound upon its shaft which constantly urges the return sprocket in a counterclockwise direction as viewed in Fig. 1 thus urging the plate carriage 221 to the left continually in well known manner.

During each cycle of operation of the record reader (one cycle of operation is determined by one revolution of reader shaft 52) in which the punch carrier 108 is being co-ordinately positioned, the plate carriage is spaced character-wise automatically and in synchronism with each revolution of the main operating shaft 18, the cross shaft 19, and the record reader shaft 52.

Figure 9:
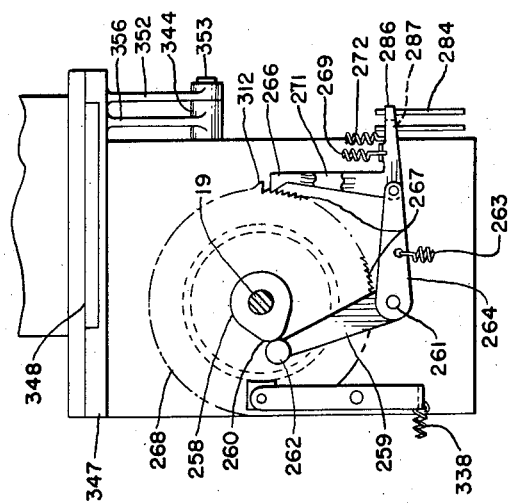
Fig. 9 is an elevational view of the right side of Fig. 8.
Figure 8:
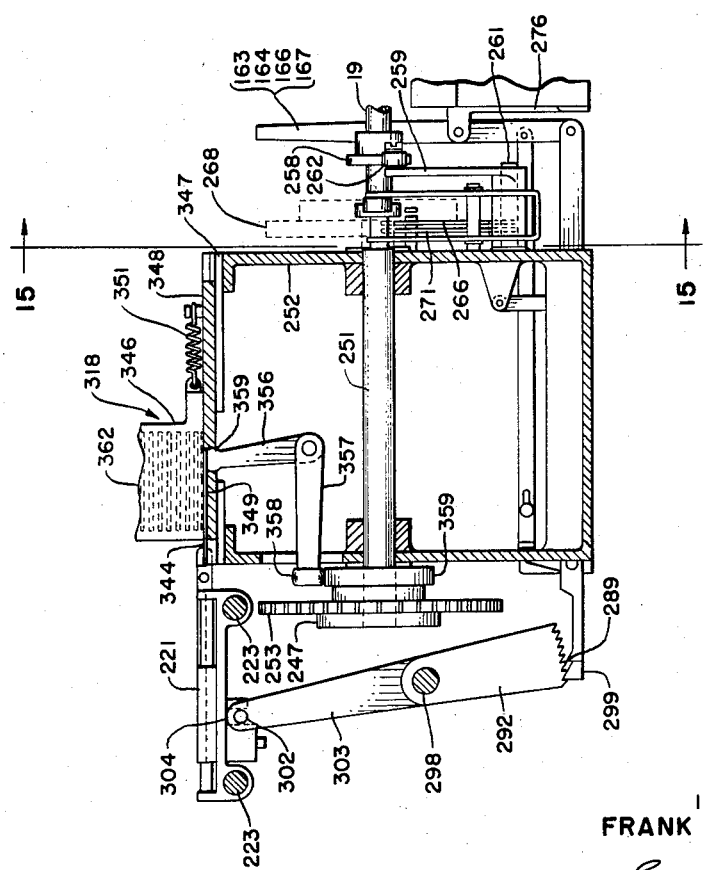
Fig. 8 is an elevational view of a portion of the right side of Fig. 1 with parts broken away to show the forward end of a cross shaft, the carriage position shaft, and the associated plate feed, line feed, and carriage mechanisms.

The spacing mechanism indicated generally at 257 in Fig. 2 is driven by the cross shaft 19 and includes a spacing cam 258, Figs. 8 and 9 (having a high portion 260), keyed to the shaft 19, and a spacing lever 259 pivotally mounted to the U-shaped frame 252 by means of a pin 261 and having a cam follower 262. A spring 263 fastened to an arm 264 of the spacing lever 259 holds the follower 262 in contact with the cam 258. A spacing detent 271 is pivotally mounted to the frame 262 and is held in engagement with teeth 267 of a carriage spacing disc 268 by a spring 272. A spacing pawl 266 pivotally mounted to the spacing lever 259 is held in engagement with the teeth 267 of the spacing disc 268 by a spring 269 such that upon each revolution of the shaft 19 the spacing pawl 266 is reciprocated by the spacing lever 259 to advance the disc 268 one tooth in a counterclockwise direction, as viewed from Fig. 9.

Since the spacing disc 268 is keyed to the carriage position shaft 251, the plate carriage 221 is moved a predetermined distance or is spaced to the right (Fig. 3) each time the spacing lever 259 is reciprocated. Obviously, when the spacing pawl 266 is not in engagement with the spacing disc 268 the spacing detent 271 holds the disc from rotating.

*Suppression of spacing*

While certain auxiliary functions such as skip, non-skip, carriage return, line feed, and plate eject, are being carried out in response to selections made in field 17, it is desirable to suppress spacing during one or more cycles of operation of the translator. Accordingly, whenever a signal calling for the performance of an auxiliary function is read by the record reader and the signal is one which during the response thereto it is desired to suppress spacing, two sensing bars are selected in the field 17. One sensing bar will be selected to initiate a mechanism for suppressing space, while the other sensing bar will initiate the particular auxiliary function.

Spacing is suppressed whenever the sensing bail 152 (Fig. 6) is blocked and this occurs when any one of the sensing bars 181 through 187 are selected. Blocking of the sensing bail 152, in turn, places the said bail in blocking relation with respect to the function lever 163 as will be apparent hereinafter. Function levers 163, 164, 166 and 167 are pivotally mounted on a rod 273 (Fig. 13)

suitably secured to ears 274 of a function bail 276. The function bail 276 is secured pivotally to the base plate 10 and carries a cam follower 277 which is held in engagement with a function cam 278 secured to the main operating shaft 18 by a spring 279. Upon each revolution of the operating shaft 18 and subsequent to the establishment of selections in the translator, the function bail 276 is rotated in a counterclockwise direction as viewed in Fig. 13, causing all function levers 163, 164, 166 and 167 to move to the left as a high portion of the cam 278 encounters the follower 277. Assuming that the sensing bail 152 is blocked or is in the dotted line position as shown in Fig. 13, it is apparent that movement of the function lever 163 to the left will be blocked causing the lever 163 to pivot clockwise about the rod 273. A link 282 pivotally mounted to the lower end of the function lever 163 will move to the left (Fig. 13). Pivotally mounted on the U-shaped frame 252 and connected to the link 282 is a bell crank 283 whose horizontal arm 284 is disposed above a co-operating lateral extension 286, of the spacing pawl 266 (Fig. 9). Consequently the lateral motion of the link 282 causes the bell crank 283 to rotate clockwise (Fig. 13) and engage the spacing pawl 266 thus rotating the pawl away from and out of engagement with the teeth 266 of the spacing disc 268. When the arm 264 subsequently reciprocates the pawl 266, no movement of the spacing disc 268 occurs.

Note that a lateral extension 287 (Fig. 9) of the detent 271 is shorter than the corresponding extension of the pawl 266, and thus the detent 271 is not contacted by the bell crank 283 and remains in engagement with the disc 268 restraining rotation thereof.

Line feed

Whenever a full line of characters has been embossed upon a printing plate, or whenever it is desired to emboss characters upon a new line, a signal known as line feed is provided on the perforated tape which when read by the record reader causes the selection of sensing bars 183 and 192 (Fig. 6). The selection of the sensing bar 183 blocks sensing bail 152 thereby suppressing spacing in the manner described above. Selection of the bar 192 blocks sensing bail 151 which in turn blocks function lever 166 so that upon the next periodic oscillation of the function lever bail, the lever 166 will pivot in a clockwise direction about the rod 273 as viewed in Fig. 13. A push bar 288 having a pawl 289 on the left end thereof for engaging the teeth 291 of a line feed lever 292 is pivotally fastened to the lower end of the function lever 166. The push bar 288 has a slot 293 formed therein for engaging a pin 294 rigidly mounted upon an ear 296 suitably secured to the base plate 10. The slot 293 is of a configuration such that when the funciton lever 166 pivots clockwise, the push bar 288 is moved to the left and is cammed upwardly causing the pawl 289 to engage a tooth 291 of the line feed lever 292 thereby rotating the lever 292 clockwise a predetermined distance against the tension of a spring 297. The line feed lever 292 is rigidly mounted to a cross rod 298 (Fig. 8) pivotally supported between the uprights 127 and 226. A detent 299 (Fig. 13) pivotally mounted on the pin 294 is held in engagement with the teeth 291 of the line feed lever 292 by a spring 301 so that when the push rod 288 returns to the right the line feed lever will be retained in its set position. As is more readily apparent in Figs. 1 and 3, a line feed rod 302 is supported by two arms rigidly secured to the cross rod 298. The line feed rod 302 is in engagement with a recess 304 (Figs. 8, 20 and 21) in the underside of the jaw 228. Movement of the push bar 288 to the left (Fig. 8) causes the jaw 228 to be advanced inwardly a predetermined distance (one line) as viewed in Fig. 3. It is to be recalled that the jaw 228 is slidably supported on the rods 227 mounted in the carriage frame 222 and disposed transversely of the carriage rods 223.

Skip, non-skip mechanism

The terms "skip" and "non-skip" are assigned to certain predetermined signals contained in the perforated tape 24. The skip signal precedes and the non-skip signal succeeds certain intelligence contained on the perforated tape to which it is desired that the punch carrier 108 be nonresponsive. This mechanism includes two sensitive, normally open, electric switches 197 and 198 (Fig. 6) suitably mounted on a bracket 201 secured to the underside of the upper base 12. Associated with the switches 197 and 198 are sensing bars 189 and 190, respectively. As shown in Fig. 12, the switches 197 and 198 are electrically connected to magnets 202 and 203, respectively, and to battery. Switches 197 and 198 are actuated when sensing bars 189 and 190 (Fig. 6), respectively, are selected. The magnet 202 having an armature 204 is suitably mounted on the bracket 205 secured to the upper base 12. With the magnet 202 in the de-energized condition and the blocking lever 42 in the normal position, an ear 206 of the armature 204 assumes a position with respect to the arm 43 of the blocking lever 42 such as that shown in Fig. 12. The armature 204 is held in the de-energized position by a spring 207.

The magnet 203 having an armature 208 is also mounted on the bracket 205. The armature 208 having a lug 209 for engaging the tip 211 of the armature 204 is pivotally mounted and is constantly urged in a clockwise direction by a spring hinge 212.

Upon the reception of the skip signal the sensing bar 189 is selected thereby actuating switch 197. Battery is applied to the coil of magnet 202 causing its armature 204 to be attracted thereto. The armature 204 is held in the energized position by the lug 209 of the armature 208. The ear 206 of the armature 204 is rotated in a counterclockwise direction causing the blocking lever 42 to rotate in a clockwise direction. The leg 44 of the blocking lever 42 is thereby positioned in blocking relation with respect to the projection 65 of T-lever 41 (Fig. 24) such that upon the next revolution of the record reader shaft the blocking plate 38 will be moved to the right. The notch accommodations of the blocking plate 38 are so cut that when the blocking plate is in the right-hand position as viewed in Fig. 24, there can be no selection of any sensing bars 104 in fields 15 and 16 and thus no co-ordinate positionment of the punch carrier 108 by the knee action devices 111, even though the code plates 36 continue to be permutatively set in response to the record reader. So long as the armature 204 is latched by the lug 209 the blocking plate 38 will remain in the right-hand position and the punch carrier 108 will assume a position (in response to the urging of springs 139 and 142) wherein all punch and die assemblies 109 will be clear of embossing levers 146.

As will be more apparent presently there is no suppression of spacing, line feed, or carriage return during the interval in which the punch carrier is under the influence of the skip signal.

Upon receipt of the non-skip signal, the sensing bar 190 (Fig. 6) is selected to thereby close the switch 198 to energize the magnet 203. This results in the attraction of the armature 208 (Fig. 12) and the immediate release of the armature 204 permitting the blocking lever 42 to assume its normal position to the right in response to the spring 46. Accordingly, upon the next revolution of the record reader shaft, the blocking plate will be moved to the left, its normal position, and the positionment of the punch carrier 108 by the fields 15 and 16 will be resumed.

Carriage return

After a predetermined number of spacing operations, or the completion of a line of embossed characters, a carriage return signal is provided on the perforated record, the response to which brings about the selection of sensing bars 184 and 194. Sensing bar 184 is selected in order to suppress the spacing operation in the manner already described, while the sensing bar 194 blocks the carriage return sensing bail 154 which in turn blocks the function lever 164. Pivotally mounted on the lower end of the function lever 164 is a link 306 (Fig. 13) similar to the link 282 connected to the function lever 163. A bell crank 307 is pivotally secured to the U-shaped frame 252 by means of a pin 308 which also accommodates the bell crank 283. The vertical arm of the bell crank 307 is pivotally connected to the link 306 while the horizontal arm 311 thereof is disposed transversely above the lateral extensions 286 and 287 (Fig. 14) of the spacing pawl 266 and the spacing detent 271, respectively. With the function lever 164 blocked by the carriage return sensing bail 154, the next oscillation of the function lever bail 276 will cause the bell crank 307 to rotate both the pawl 266 and the detent 271 out of engagement with the teeth 267 of the spacing disc 268 thereby freeing the disc 268 (Fig. 9) for clockwise rotation (counter-clockwise as viewed in Fig. 1) which is initiated by the return spring of the carriage return sprocket 254 (Fig. 1). The plate carriage moves to the left (Fig. 1) in response to the return spring until the spacing pawl 266 and the spacing detent 271 encounter a stop lug 312 (Fig. 14) formed integral with the spacing disc 268. The lug 312 is so positioned upon the periphery of the spacing disc 268 that when the pawl 266 and the detent 271 encounter the lug 312, the plate carriage 221 has moved to the left (Fig. 1) or "returned" a predetermined distance thus positioning the plate carriage 221 with respect to the embossing levers 146 at the point for beginning a new line of embossed characters. (See dotted line position of plate carriage in Fig. 3.)

*Plate eject*

A mechanism as provided for ejecting a plate and for securing a new blank plate. This function is initiated in response to a predetermined signal contained in the record known as plate eject.

When the plate eject signal is encountered by the record reader a permutative setting of the code plates 36 will occur which permits the selection of sensing bars 191 and 193. The selection of sensing bar 191 will block sensing bail 149 which in turn blocks function lever 167 in the manner described above (Fig. 13). Pivotally mounted on the function lever 167 and slidably supported by a screw 314 is a push rod 315 (Fig. 13). As the function lever 167 oscillates to the left, the push rod 315 in turn moves to the left, as viewed in Fig. 13, striking an arm 316 of the detent 299 and rotating it so as to release the line feed lever 292. The tension of the spring 297 causes the line feed lever 292 to rotate counterclockwise (Fig. 13) thus moving the jaw 228 outwardly to a position which corresponds to that assumed when the first line is to be embossed upon a plate.

The selection of sensing bar 193 blocks the bail 153 whose lower lateral extension 317 (Fig. 25) is disposed inside the similar extension of the bail 154. Thus it is clear that the function lever 164 will be blocked in a manner which will increase its pivotal motion when oscillated to the left by the function lever bail 276 (Fig. 13). Correspondingly, the spacing pawl 266 and the spacing detent 271 will be rotated away from the spacing disc 268 in a manner similar to the action just described for initiating carriage return. However, because of the increased pivotal motion of the function lever 164, the spacing pawl and the spacing detent will rotate through an angle sufficient to clear the stop lug 312 (Fig. 14) of the spacing disc 268 permitting the plate carriage to move all the way to the left (Fig. 1) to eject a plate in response to the return sprocket and spring. The plate is ejected when the roller 237 (Fig. 1) engages the cammed surface or strap 241 causing the jaw 231 to open, thus releasing a plate.

When the carriage has completed its travel to the left and ejected the plate, it automatically returns to the right to secure a new plate from a plate magazine indicated generally at 318 (Fig. 1) and then positions the plate and carriage at the point shown in dotted lines of Fig. 3 in correct alignment for embossing the first character of the first line of intelligence, in a manner presently described.

Figure 18:
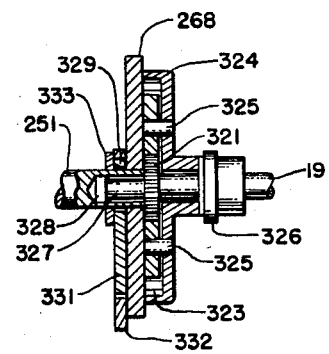
Fig. 18 is a sectional view taken substantially along line 18—18 of Fig. 17.

The movement of the carriage to the right to secure a new plate is accomplished by a train of planetary gears 321, 322, 323 of which the sun gear 321 is mounted on the left end of the cross shaft 19, as viewed in Fig. 18. Intermediate gears 322, which engage the sun gear 321, and the gear 323 integral with the spacing disc 268, are rotatably mounted on a brake drum 324 by means of the pins 325. The brake drum 324 is rotatably mounted upon the cross shaft 19 and is retained in position by a collar 326. Note that there is no direct connection between the cross shaft 19 and the carriage position shaft 251, and that the two shafts are maintained in alignment by the co-operation of the end 327 of the cross shaft 19 and the counterbore 328 of the carriage position shaft 251. Rotatably mounted on the carriage position shaft 251 is a strap 329 having an arm 331 (Fig. 15).

Figure 16:
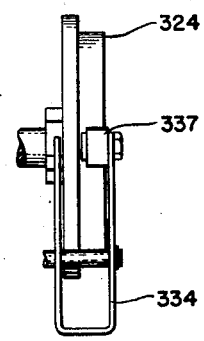
Fig. 16 is a view of the right side of Fig. 15.
Figure 17:
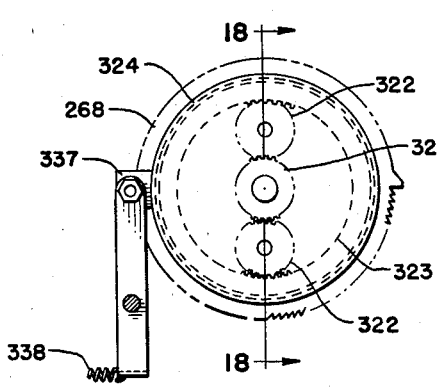
Fig. 17 shows a group of planetary gears associated with the spacing disc.

Rotatably mounted upon the strap 329 is a release cam arm 332. A collar 333 is provided to retain the strap and cam in the position shown in Fig. 18. Pivotally mounted on the U-shaped frame 252 (Fig. 2) is a U-shaped member 334 (Figs. 2 and 16) having a cam follower 336 on one leg thereof and a brake shoe 337 on another leg (Fig. 17). A spring 338 acts to urge the cam follower 336 into engagement with the cam 332, and the brake shoe 337 into engagement with the brake drum 324. A pin 341 is rigidly mounted on the spacing disc 268 such that upon rotation of the spacing disc, the pin 341 will strike the upper or lower (see dotted line positions of pins 341 in Fig. 15) side of the arm 331 (depending upon the direction of rotation of disc 168) thereby driving the arm 331 into engagement with set screws 342 causing the apex portion 330 of cam arm 332 to be rotated into or out of engagement with the follower 336.

Figure 15:
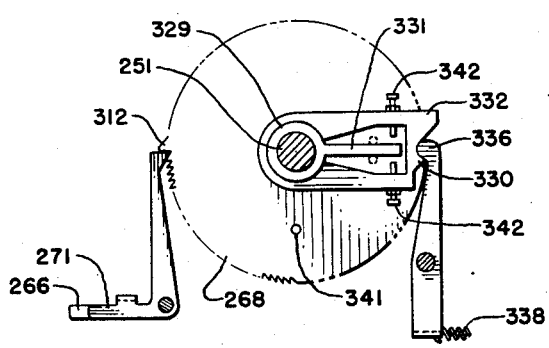
Fig. 15 is a sectional view of Fig. 8 taken along the line 15—15.

Thus, when the spacing pawl 266 and the spacing detent 271 have been rotated clear of the stop lug 312 as a result of the selection of sensing bar 193, and the plate carriage 221 begins to travel to the left (as viewed in Fig. 1) in response to the carriage return spring, the spacing disc 268 and its associated pin 341 rotate in a counterclockwise direction (Figs. 1 and 15). Pursuant to this counterclockwise rotation, the pin 341 impinges against the lower side of arm 331 causing it to come into contact with the upper set screw 342 and effect a limited counterclockwise rotation of the cam arm 332 (as viewed in Fig. 15) so as to cause apex 330 to urge the cam follower 336 outwardly against the action of spring 338, thus lifting the brake shoe 337 away from the drum 324. At this time, then, the high or apex portion 330 of the cam arm 332 is in engagement with the follower 336 (Fig. 15) so as to hold the brake shoe 337 off the drum 324. Since the cross shaft 19 is being rotated constantly by main drive shaft 18, and the brake shoe 337 is being held off the brake drum 324, the differential in speed and direction of rotation between the cross shaft 19 (driven by main shaft 18) and the carriage position shaft 251 (driven by carriage return sprocket 254, Fig. 1) is absorbed by the planetary gear train and is expended by the free rotation of the drum 324. After the carriage 221 has completed its travel to the left (under the influence of the carriage return spring) in response to the plate eject signal, it will then be positively driven to the right to pick up a new plate, under the control of shaft 19 through the differential means shown in Figs. 17 and 18, during which movement the carriage return spring (not shown) will be rewound. Also, during this rightward movement of carriage 221, the spacing ratchet 268 will be rotated clockwise (as viewed in Fig. 15) so that the pin 341 thereon will travel from its position in contact with the underside of arm 331 to a position whereat the pin will come into contact with the upper side of arm 331, such that limited clockwise rotation will be imparted to arm 331 to bring arm 331 into contact with the lower set screw 342, whereupon, due to the force imparted (clockwise) upon cam arm 332, the cam follower 336 of arm 334 will ride off of the apex 330 into the position shown in Fig. 15. Thus, this rotation frees the cam follower 336 from cam portion 330 to permit brake shoe 332 to again engage and stop the drum 324. As the carriage moves to the right, the roller 237 engages the strap 242 normally in a vertical position (Fig. 2) causing the plate jaw 231 to pivot to the open position to receive a new plate 344 (Fig. 8) fed from the magazine 318.

The magazine 318 comprises an upright metallic container 346 (Fig. 8) having a rectangular cross section and rigidly mounted to a base 347 secured to the top of U-frame 252. A movable plate 348 having a recess 349 for accommodating one embossing plate 344 is urged to the left, as viewed in Fig. 8, by a spring 351, Integral with the base 347 is an arm 352 for supporting a stub shaft 353 (Fig. 9). Rotatably mounted on the stub shaft is a sleeve 344 having an arm 356 which engages another recess 359 in the plate 348, and having another arm 357 provided with a cam follower 358. The follower 358 is held in engagement with a plate feeding cam 359, keyed to the carriage position shaft, 251, by the tension of the spring 351. As the plate carriage moves to the right after ejecting a plate, a high portion of the plate feed cam 359 is gradually presented to the feed cam follower 358 causing the plate 348 to move to the right, as viewed in Fig. 8, until the recess 349 assumes a position flush with a vertical stack of plates 362 contained with the magazine 318. In this position the recess 349 receives a blank embossing plate. As the feed cam follower 358 in turn encounters a low portion of the feed cam 359, the movable plate 348 carrying the blank plate 344 advances to the left, as viewed in Fig. 8, in timed relation with respect to the advance of the plate carriage 221 to the right (Fig. 1) such that, as the plate carriage arrives in front of the magazine, a blank plate 344 is received between the jaws 228 and 231 opened by the camming action of the strap 242.

Subsequently and according to suitable timing, the high portion of the cam 247 (Fig. 2) is presented to the arm 246 of the strap 242 thereby permitting the strap to move inwardly (clockwise, as viewed in Fig. 2) and out of engagement with the roller 237—thus allowing the jaws 228 and 231 to close and grasp the plate 344.

It is to be borne in mind that as the carriage advances to the right in response to the clockwise rotation imparted to the spacing disc 268 by the cross shaft 19, the pin 341 (Fig. 15) necessarily traverses a clockwise path.

An instant after the plate jaws close upon a new plate, the pin 341 strikes the top side of the arm 331, driving it against the lower set screw 342 to rotate the cam arm 332 clockwise (Fig. 15) thus releasing the brake shoe 337. The spacing shaft is now free to respond to its return spring, which constantly urges the spacing ratchet 268 in a counterclockwise direction (as viewed in Fig. 15). Accordingly, the carriage immediately moves to the left, stopping at the carriage return position, thus positioning the blank plate with respect to the embossing levers 146 (dotted line position shown in Fig. 3) to that upon the next cycle of operation of the embossing machine the first character of the first line of intelligence may be embossed.

The scheme for arresting the return of the carriage to left and stopping it exactly at the carriage return position will now be described.

It may be recalled that in initiating the plate eject function, the selection of sensing bar 193 resulted ultimately in the release of the spacing disc 268 for counterclockwise rotation in response to its return spring. The pawl 266 and the detent 271 were rotated free of all spacing teeth 267 as well as the lug 312 (Fig. 14). The selection of bar 193 remains uninterrupted while the carriage moves to the right to grasp a new plate, after ejecting an old plate, as will be more apparent presently.

It may also be recalled that upon the receipt of the plate eject signal, in addition to bringing about the selection of sensing bar 193, the time delay mechanism is actuated by the acceptance of the rod 40 in the aligned slots 37 (Fig. 24) and tape feed stops for a predetermined number of revolutions of the record reader shaft. Thus, the selection of sensing bar 193 continues cyclically throughout the delay interval. At the expiration of the delay interval (which is tolled by the record reader delay mechanism, and which represents the time required for the ejection of an embossed plate and the grasping of a new one) the blocking plate 38 is shifted to the right (Fig. 24). As previously stated, and as described at length in said patent to Walden, the shifting of the seventh plate or the blocking plate 38 to the right reinstates the feeding of the tape.

In the present embodiment of the invention the blocking plate 38 has been provided with a code notch accommodation such that upon the shifting of the blocking plate 38 to the right by the delay mechanism, the previous selection corresponding to plate eject is disrupted and the selection of sensing bar 188 is facilitated. The selection of bar 188 (Fig. 25) blocks an extension 366 of carriage return sensing bail 154 which operates (as described in the paragraph dealing with the carriage return mechanism) to position the spacing pawl 266 and the spacing detent 271 in the path of the carriage return stop lug 312 so as to stop the carriage at the carriage return position. Upon the next revolution of the record reader shaft, tape feed will resume, and the blocking plate will assume its normal position.

Operation

To prepare for operation, the record in the form of a coil of tape perforated in six unit Baudot code is placed in a tape holder (not shown) and threaded into the record reader 13. A stack of blank plates are placed in the magazine 318 and the main shaft 18 is operated. The tape 24 is perforated with the various code combinations necessary to operate the machine and to select characters. The first code perforation is that of plate eject. This causes the machine to operate to eject any plate already in the machine, secure a new plate from the magazine, and move it into position to emboss the first character. During the interval required to accomplish this function it is to be recalled that tape feeding is delayed. Code combinations for other characters appear in order upon the tape 24, including combinations for space, carriage return, and line feed, as necessary. Note that upon the receipt of the code combination for space, no selection occurs in the fields 15, 16 and 17, thus the spacing which occurs automatically with each revolution of the main operating shaft 18 and the record reader shaft 52 represents the response to the space code combination appearing in the tape. Since no selection occurs in any field, no character is embossed. The response to the space code combination occurring in the tape is termed word space in contrast to character space.

Immediately following the code combinations representing all the intelligence that it is desired to emboss upon a particular plate, the tape is perforated with plate eject. The response to this perforation initiates the delay mechanism, thereby delaying further advance of the tape until the embossed plate is ejected and a new one is grasped and brought to the carriage return position.

With the main operating shaft in operation the record reader is placed in operation by turning the operating lever to the "On" position. Sequentially and according to proper timing, the perforated tape will be advanced in step-by-step fashion so that a transverse row of perforations are read by the feeler levers, and the intelligence read is converted into a corresponding permutation of the code plates during each cycle of operation. The permutation of the code plates will permit the selection of two sensing bars one in field 15 and one in field 16 (but if the code perforation represents an auxiliary function, the selection will be in field 17). These selections will block associated sensing bails 136, which in turn limit the motion of the knee action devices as they approach the lateral extensions of the blocked bails, thereby positioning a particular punch and die assembly in alignment with the embossing levers. While the code plates are being permutatively set, the spacing mechanism acts automatically with each revolution of the main operating shaft to space the plate one space to the right. The main shaft and the record reader shaft are connected in a one to one ratio so that each makes one revolution in a cycle of operation. In timed sequence the embossing levers compress the selected punch and die assembly to emboss a character upon the printing plate. The cycle is then repeated.

Upon the completion of a line of embossed characters, the combination for line feed is encountered and will cause the plate to advance inwardly one line. Next the combination for carriage return is read, and the plate carriage moves to the left to the carriage return position. Note that the angle through which the carriage position shaft and its associated cams rotate while the plate carriage is spaced through one line from the carriage return position is not sufficient to actuate the plate feeding mechanism.

As stated before, the code combinations representing all the intelligence to be embossed upon a single plate are followed by the code for plate eject, thus automatically calling for a new blank plate.

It is to be noted that any blank area or area of no code perforations occurring in the tape can be considered to represent a code combination known as "blank." The blank signal sets up the selection of sensing bar 181, and thus the only response to this code combination is that of space suppression and the selection of a blank punch and die assembly.

From time to time certain intelligence which is embossed on some plates is omitted from others prepared from the same tape. When it is desired to eliminate certain intelligence from particular plates the "skip" signal is inserted in the blank area preceding the material to be eliminated and the code combination known as "non-skip" is inserted immediately following the material to be eliminated. When the record reader encounters such signals the material between the signals is not embossed. However, tape feeding is not interrupted, and the spacing, line feed, carriage return and other functions are recognized. It is to be recalled that receipt of the "skip" signal simply positions the blocking plate 38 so as to block all selections in fields 15 and 16. The blocking plate 38 is returned to its normal position in response to the "non-skip" signal.

It is to be further noted that the "blank" code combination can be readily converted to the "skip," "non-skip" or to a "rub-out" signal. The "rub-out" signal is denoted by a full transverse row of code perforations and causes the selection of sensing bar 182. It is utilized to negate a code perforation made in error or to rub-out a code perforation no longer desired. The only response to the rub-out code combination is that of space suppression.

It is to be understood that the above-described arrangement of the present invention is merely illustrative of the application of the principles thereof. Other arrangements may be readily devised by those skilled in the art which will embody the principles of the invention and fall within the spirit and scope thereof.

What is claimed is:

1. In combination in a signal responsive apparatus, a series of plates settable permutatively and having notches formed therein, a corresponding series of signal responsive elements for setting said plates so as to align said notches transversely according to a predetermined code, an additional notched plate associated with said series of plates, a delay mechanism responsive to certain permutative settings of said notched plates for setting said additional plate, and means responsive to certain other permutative settings of said notched plates for setting said additional plate.

2. In combination in a signal responsive apparatus, a series of plates having groups of code notch accommodations therein and settable permutatively, a series of selectable bars associated with each of said groups and adapted to engage said notch accommodations, a series of signal responsive elements for setting said plates such that certain ones of the selectable bars engage notch accommodations in each of said groups, an additional plate associated with said series of plates, and means actuated by the selection of a bar in one of said groups for setting said additional plate.

3. In combination in a signal responsive apparatus, a series of plates having code notch accommodations arranged in groups and settable permutatively, a corresponding series of signal responsive elements for setting said plates so that a transverse alignment of notches occurs in each group in consecutive cycles, an additional plate associated with said series of plates and settable to obstruct said aligned notches in certain of said groups, means responsive to a predetermined setting of said series of plates for setting said additional plate so as to obstruct the aligned notches in certain of said groups, and means responsive to a subsequent setting of said series of plates for setting said additional plate so as to clear the obstruction of any aligned notches.

4. An embossing machine comprising a record reader, a carriage, a track for supporting said carriage, a co-ordinately positionable element, a translator actuated by said record reader, means actuated by a portion of said translator for locating said co-ordinately positionable element, means actuated by another portion of said translator for moving said carriage, and means responsive to said record reader for suppressing that portion of said translator which locates the co-ordinately positionable element.

5. An embossing machine comprising a record reader, a carriage, means for supporting said carriage, a co-ordinately positionable element, a translator actuated by said record reader, knee-action mechanisms actuated by a portion of said translator for locating said co-ordinately positionable element, means actuated by another portion of said translator for moving said carriage, and means responsive to said record reader for suppressing that portion of said translator which controls said co-ordinately positionable element.

6. In combination in a signal responsive apparatus, a series of code plates settable permutatively, a series of signal responsive elements for setting said code plates, a time delay mechanism, a carriage, means responsive to a permutation of said plates for intermittently moving said carriage to and fro along a predetermined path and within certain predetermined minimum limits, and means responsive to said time delay mechanism and another permutation of said plates for moving said carriage along said predetermined path and within certain predetermined maximum limits.

7. In combination, a co-ordinately movable member, signal responsive means, a plurality of code plates selectively controlled by said signal responsive means, said code plates having selecting facilities arranged in groups, a plurality of selectable elements co-operably associated with each of certain of said groups of selecting facilities, a plurality of stop members co-operably related to the selectable elements associated with said certain of said groups of selecting facilities for determining the extent of movement of said movable member in predetermined directions, a pair of knee-action means adapted to be impinged against selected stop members to effectuate the co-ordinate positionment of said movable member, function means, other selectable elements co-operably related to other of said groups of selecting facilities for controlling said function means, and means controlled by said signal responsive means for suppressing the co-ordinate positionment of said movable member during operation of said function means.

8. In combination, a co-ordinately movable member, a record reader, a plurality of code plates selectively controlled by said record reader, said code plates having selecting facilities arranged in groups, a plurality of selectable elements co-operably associated with each of certain of said groups of selecting facilities, a plurality of stop members co-operably related to the selectable elements associated with said certain of said groups of selecting facilities for determining the extent of movement of said movable member in predetermined directions, a pair of knee-action means adapted to be impinged against selected stop members to effectuate the co-ordinate positionment of said movable member, function means, other selectable elements co-operably related to other of said groups of selecting facilities for controlling said function means, and means controlled by said record reader for suppressing the co-ordinate positionment of said movable member during operation of said function means.

9. In combination, a co-ordinately movable indicia carrying member, signal responsive means, a plurality of code plates selectively controlled by said signal responsive means, said code plates having selecting facilities arranged in groups, a plurality of selectable elements co-operably associated with each of certain of said groups of selecting facilities, a plurality of stop members co-operably related to the selectable elements associated with said certain of said groups of selecting facilities for determining the extent of movement of said movable indicia carrying member in predetermined directions, a pair of knee-action means adapted to be impinged against selected stop members to effectuate the co-ordinate positionment of said movable indicia carrying member, embossing means for impressing said indicia on a plate, a plate carrying means, other selectable elements co-operably related to other of said groups of selecting facilities, and means for actuating said plate carrying means to various operating stations under the control of said other selectable elements.

10. In combination, a co-ordinately movable indicia carrying member, a record reader, a plurality of code plates selectively controlled by said record reader, said code plates having selecting facilities arranged in groups, a plurality of selectable elements co-operably associated with each of certain of said groups of selecting facilities, a plurality of stop members co-operably related to the selectable elements associated with said certain of said groups of selecting facilities for determining the extent of movement of said movable member in predetermined directions, a pair of knee-action means adapted to be impinged against selected stop members to effectuate the co-ordinate positionment of said movable member, embossing means for impressing said indicia on a plate, a plate carrying means, other selectable elements co-operably related to other of said groups of selecting facilities, and means comprising differential facilities for actuating said plate carrying means to various operating stations under the control of said other selectable elements.

11. In an embossing machine, an indicia carrier, supporting means for said indicia carrier movable under certain operating conditions from a normal position in either of two directions, drive means, a plurality of pairs of stops for said supporting means for enabling varying degrees of movement thereof in either direction, signal responsive means operable in response to signal code combinations, means effective under the control of said signal responsive means to select a predetermined pair of said stops to enable a predetermined amount of movement of said supporting means, knee-action devices operatively connected between said supporting means and said drive means, said knee-action devices co-operable with said stops to effectuate the co-ordinate positionment of said supporting means, embossing means for impressing selected indicia on a plate, a plate carrying means, plate feed means, plate eject means, and further means also effective under the control of said signal responsive means for actuating said plate carrying means automatically to various operating stations, whereby the plate feed, plate embossing and plate eject operations are effectuated.

12. In an embossing machine, an indicia carrier, supporting means for said indicia carrier movable under certain operating conditions from a normal position in either of two directions, drive means, a plurality of pairs of stops for said supporting means for enabling varying degrees of movement thereof in either direction, signal responsive means operable in response to signal code combinations, means effective under the control of said signal responsive means to select a predetermined pair of said stops to enable a predetermined amount of movement of said supporting means, instrumentalities operative between said supporting means and said drive means, said instrumentalities co-operable with said stops to effectuate the co-ordinate positionement of said supporting means, embossing means for impressing selected indicia on a plate, a plate carrying means, plate feed means, plate eject means, and further means also effective under the control of said signal responsive means for actuating said plate carrying means automatically to various operating stations, whereby the plate feed, plate embossment and plate eject operations are effectuated.

13. In a recorder, an indicia carrier, supporting means for said indicia carrier movable under certain operating conditions from a normal position in either of two directions, drive means, a plurality of pairs of stops for said supporting means for enabling varying degrees of movement thereof in either direction, signal responsive means operable in response to signal code combinations, means effective under the control of said signal responsive means to select a predetermined pair of said stops to enable a predetermined amount of movement of said supporting means, instrumentalities operative between said supporting means and said drive means, said instrumentalities co-operable with said stops to effectuate the co-ordinate positionment of said supporting means, means for producing a record on a record receiving medium according to the selected indicia, means for carrying said record receiving medium, function means, and further means also effective under the control of said signal responsive means for actuating said receiving medium carrying means to various operating stations, whereby the record producing and function operations are effectuated.

14. In a recorder, an indicia carrier, supporting means for said indicia carrier movable under certain operating conditions from a normal position in either of two directions, drive means, a plurality of pairs of stops for said supporting means for enabling varying degrees of movement thereof in either direction, signal responsive means operable in response to signal code combinations, means effective under the control of said signal responsive means to select a predetermined pair of said stops to enable a predetermined amount of movement of said supporting means, instrumentalities operative between said supporting means and said drive means, said instrumentalities co-operable with said stops to effectuate the co-ordinate positionment of said supporting means, means for producing a record on a record receiving medium according to the indicia selected, means for carrying said record receiving medium, function means, and means comprising differential facilities also effective automatically under the control of said signal responsive means for actuating said receiving medium carrying means to various operating stations, whereby the record producing and function operations are effectuated.

15. In combination, a co-ordinately movable indicia carrying member, signal responsive means, a plurality of code plates selectively controlled by said signal responsive means, said code plates having selecting facilities arranged in groups, a plurality of selectable elements co-operably associated with each of certain of said groups of selecting facilities, a plurality of stop members co-operably related to the selectable elements associated with said certain of said groups of selecting facilities for determining the extent of movement of said movable indicia carrying member in predetermined directions, a pair of knee-action means adapted to be impinged against selected stop members to effectuate the co-ordinate positionment of said movable indicia carrying member, embossing means for impressing said indicia on a plate, a plate carrying means, a first means for imparting movement in one direction to said plate carrying means, a second means for imparting movement in another direction to said plate carrying means, and means controlled by said signal responsive means for determining the directional movements of said plate carrying means by said first and said second means.

16. In combination, a co-ordinately movable indicia carrying member, signal responsive means, a plurality of code plates selectively controlled by said signal responsive means, said code plates having selecting facilities arranged in groups, a plurality of selectable elements co-operably associated with each of certain of said groups of selecting facilities, a plurality of stop members co-operably related to the selectable elements associated with said certain of said groups of selecting facilities for determining the extent of movement of said movable indicia carrying member in predetermined directions, a pair of knee-action means adapted to be impinged against selected stop members to effectuate the co-ordinate positionment of said movable indicia carrying member, embossing means for impressing said indicia on a plate, a plate carrying means, a first means for imparting movement in one direction to said plate carrying means, a second means for imparting movement in another direction to said plate carrying means, other selectable elements co-operably related to other of said groups of selecting facilities, and means effective under the control of said other selectable elements for determining the directional movements of said plate carrying means by said first and said second means.

17. In combination, a co-ordinately movable indicia carrying member, signal responsive means, a plurality of code plates selectively controlled by said signal responsive means, said code plates having selecting facilities arranged in groups, a plurality of selectable elements co-operably associated with each of certain of said groups of selecting facilities, a plurality of stop members co-operably related to the selectable elements associated with said certain of said groups of selecting facilities for determining the extent of movement of said movable indicia carrying member in predetermined directions, a pair of knee-action means adapted to be impinged against selected stop members to effectuate the co-ordinate positionment of said movable indicia carrying member, embossing means for impressing said indicia on a plate, a plate carrying means, a carriage return means for imparting movement in one direction to said plate carrying means, a differentially controlled means for imparting movement in another direction to said plate carrying means, and means controlled by said signal responsive means for determining the directional movements of said plate carrying means to various operating stations by said carriage return means and said differentially controlled means.

18. In an embossing machine, an indicia carrier, supporting means for said indicia carrier movable under certain operating conditions from a normal position in either of two directions, drive means, a plurality of pairs of stops for said supporting means for enabling varying degrees of movement thereof in either direction, signal responsive means operable in response to signal code combinations, means effective under the control of said signal responsive means to select a predetermined pair of stops to enable a predetermined amount of movement of said supporting means, instrumentalities operative between said supporting means and said drive means, said instrumentalities co-operable with said stops to effectuate the co-ordinate positionment of said supporting means, embossing means for impressing selected indicia on a plate, a plate carrying means, plate feed means, plate eject means, a first means for imparting movement in one direction to said plate carrying means, a second means for imparting movement in another direction to said plate carrying means, and further means also controlled by said signal responsive means for determining the directional movements of said plate carrying means to various operating stations by said first and said second means, whereby the plate feed, plate embossment and plate eject operations are facilitated.

19. In combination in a plate embossing machine, a signal responsive means, a plate carrying means having a plate receiving station, a plate embossing station and a plate eject station, and means effective under the control of said signal responsive means in response to a predetermined signal for actuating said plate carrying means automatically in a single operation from said plate embossing station to said plate eject station to said plate receiving station and back to said plate embossing station, whereby the plate receiving, plate embossment and plate eject operations are facilitated.

20. In combination in a plate embossing machine, a signal responsive means, a plate carriage having a plate receiving station, a plate embossing station and a plate eject station, a track for supporting said carriage, and means effective under the control of said signal responsive means in response to a predetermined signal for moving said carriage automatically to and fro along said track in a single operation from said plate embossing station to said plate eject station to said plate receiving station and back to said plate embossing station, whereby operations incident to plate embossing are facilitated.

21. In combination in a plate embossing machine, a signal responsive means, a plate carriage having a plate receiving station, a plate embossing station and a plate eject station, a track for supporting said carriage, and means effective under the control of said signal responsive means in response to a predetermined signal for moving said carriage automatically to and fro along said track in a single operation to said stations, whereby the plate receiving, plate embossment and plate eject operations are facilitated.

22. In combination in a plate embossing machine, signal responsive means, a plate carrying means having a plate receiving station, a plate embossing station and a plate eject station, a carriage return means for imparting movement in one direction to said plate carrying means, a differentially controlled means for imparting movement in another direction to said plate carrying means, and means controlled by said signal responsive means for determining the directional movements of said plate carrying means to said various stations by said carriage return means and said differentially controlled means.

23. In combination in a plate embossing machine, a signal means, a single plate carriage having a plate receiving station, a plate embossing station and a plate eject station, and means effective under the control of said signal responsive means in response to a predetermined signal for actuating said single plate carriage automatically in a single operation to said stations, whereby the plate receiving, plate embossment and plate eject operations are facilitated.

References Cited in the file of this patent

UNITED STATES PATENTS

| | | |
|---|---|---|
| 2,090,654 | Walden | Aug. 24, 1937 |
| 2,244,115 | Pitman | June 3, 1941 |
| 2,378,371 | Tholstrup | June 12, 1945 |
| 2,498,038 | Gruver | Feb. 21, 1950 |
| 2,528,435 | Isett | Oct. 31, 1950 |
| 2,576,596 | Gollwitzer | Nov. 27, 1951 |
| 2,639,017 | Croucher | May 19, 1953 |

UNITED STATES PATENT OFFICE
CERTIFICATE OF CORRECTION

Patent No. 2,911,086 November 3, 1959

Frank Martindell

It is hereby certified that error appears in the printed specification of the above numbered patent requiring correction and that the said Letters Patent should read as corrected below.

Column 21, line 2, for "signal means" read -- signal responsive means --.

Signed and sealed this 16th day of February 1960.

(SEAL)
Attest:

KARL H. AXLINE
Attesting Officer

ROBERT C. WATSON
Commissioner of Patents